United States Patent
Terentic et al.

(10) Patent No.: US 12,024,134 B2
(45) Date of Patent: Jul. 2, 2024

(54) WIPER LEVER

(71) Applicant: Robert Bosch GmbH, Stuttgart (DE)

(72) Inventors: Andrija Terentic, Belgrad (RS); Harald Rapp, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/924,178

(22) PCT Filed: Apr. 13, 2021

(86) PCT No.: PCT/EP2021/059539
§ 371 (c)(1),
(2) Date: Nov. 9, 2022

(87) PCT Pub. No.: WO2021/228479
PCT Pub. Date: Nov. 18, 2021

(65) Prior Publication Data
US 2023/0174021 A1 Jun. 8, 2023

(30) Foreign Application Priority Data
May 12, 2020 (DE) ............... 20 2020 102 660.7

(51) Int. Cl.
*B60S 1/34* (2006.01)
*B60S 1/48* (2006.01)
(Continued)

(52) U.S. Cl.
CPC ............ *B60S 1/3415* (2013.01); *B60S 1/482* (2013.01); *B60S 1/524* (2013.01); *B60S 1/3862* (2013.01)

(58) Field of Classification Search
CPC ........ B60S 1/522; B60S 1/524; B60S 1/3415; B60S 1/3862; B60S 1/482
(Continued)

(56) References Cited

U.S. PATENT DOCUMENTS

| 3,143,753 A * | 8/1964 | Torelv ............... B60S 1/48 15/250.04 |
| 2005/0086758 A1* | 4/2005 | Arkashevski ......... B60S 1/522 15/250.04 |
| 2019/0344758 A1 | 11/2019 | Toyama |

FOREIGN PATENT DOCUMENTS

| DE | 102010054687 A1 | 6/2012 |
| DE | 102013113691 A1 | 6/2015 |
| WO | 2020035190 A1 | 2/2020 |

OTHER PUBLICATIONS

Machine language translation of description portion of WO publication 2020/035190, published Feb. 2020. (Year: 2020).*

(Continued)

*Primary Examiner* — Gary K. Graham
(74) *Attorney, Agent, or Firm* — Michael Best & Friedrich LLP

(57) ABSTRACT

A wiper lever (10) for cleaning a vehicle pane by means of a movement in a first and a second direction is proposed. Said wiper lever comprises a wiper blade (12), a wiper arm (14), an adapter (16) for securing the wiper blade (12) to the wiper arm (14) and a hydraulic system (18) which conducts a liquid from a vehicle to the wiper blade (12) via the wiper arm (14) in order to eject the liquid via nozzles (20) on the wiper blade (12). Said wiper lever comprises at least one nozzle (20) which is oriented in the first direction (1) and one nozzle (20) which is oriented in the second direction. According to the invention, a first valve (221) for the first direction is positioned closer to the nozzles (20) in the direction of flow (3) of the liquid than a second valve (222) for the second direction (2).

8 Claims, 1 Drawing Sheet

(51) Int. Cl.
*B60S 1/52* (2006.01)
*B60S 1/38* (2006.01)

(58) Field of Classification Search
USPC .......................... 15/250.01, 250.04, 250.02
See application file for complete search history.

(56) References Cited

OTHER PUBLICATIONS

Translation of International Search Report for Application No. PCT/EP2021/059539 dated Jul. 5, 2021 (2 pages).

\* cited by examiner

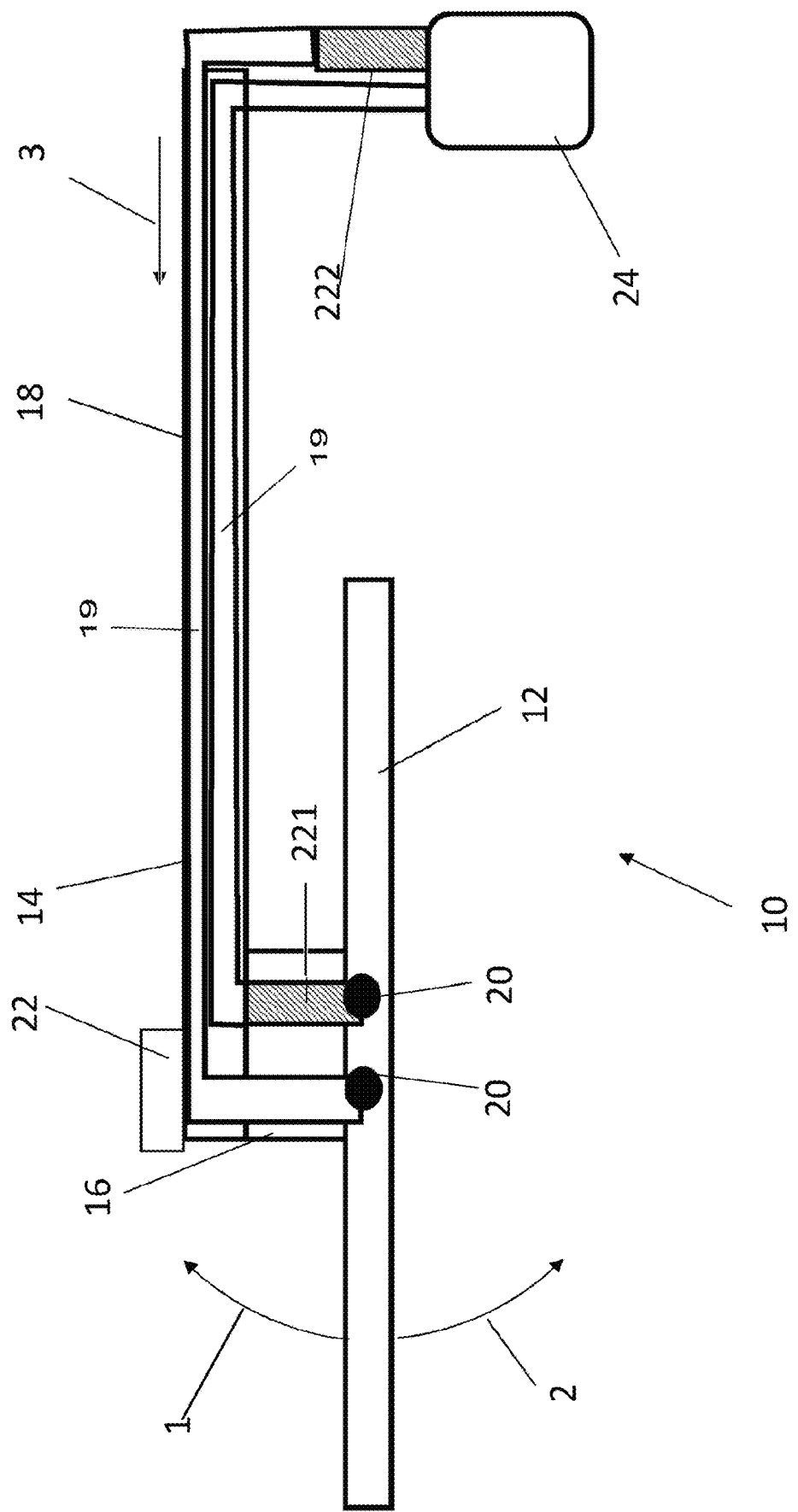

WIPER LEVER

BACKGROUND OF THE INVENTION

The invention relates to a wiper lever for cleaning a vehicle pane by means of a movement in a first and a second direction, comprising a wiper blade, a wiper arm, an adapter for securing the wiper blade to the wiper arm and a hydraulic system which conducts a liquid from a vehicle to the wiper blade via the wiper arm in order to eject the liquid via nozzles on the wiper blade, wherein at least one nozzle is oriented in the first direction and one nozzle is oriented in the second direction.

Wiper blades having nozzles which guide a liquid directly onto the wiper blade and eject the liquid at that point are known. In this case, the liquid is conveyed by a liquid pump which is arranged in the vehicle. If a valve is now arranged in a line required for the conveyance so that the flow of liquid may be controlled, it leads to delays between the exit of the liquid from the nozzle and the starting of the pump if the valve is spaced apart from the nozzle, since the portion of the line between the valve and nozzle is empty. The pump has to fill up this empty section of the line again with liquid before the liquid is able to exit. The further the valve is removed from the nozzle, the more time is required for filling the empty part of the line. In particular, if the wiper lever is able to spray in two directions, wherein in each case one valve is provided for one direction, then it is advantageous if at least one direction is not subjected to any significant delay.

SUMMARY OF THE INVENTION

It is the object of the present invention to provide a hydraulic system for a wiper lever which ensures a very short reaction time of the nozzles.

It is proposed to position a first valve for the first direction closer to the nozzles in the direction of flow of the liquid than a second valve for the second direction. The lines extend as far as the nozzles, from a reservoir with the pump for the liquid which is provided for the cleaning.

The valves are arranged in the lines. The line section for the first valve, which is arranged between the nozzle and valve, is shorter than in the case of the second valve. As a result, the reaction time for the ejection of the liquid in the first direction is reduced.

Advantageously the movement for the cleaning may be a reciprocating movement of the wiper lever, wherein the first direction is an upward wiping and the second direction is a downward wiping, wherein the first valve permits liquid to pass to the nozzles which are oriented in the first direction, whilst the second valve permits liquid to pass to the nozzles which are oriented in the second direction. In this case, the nozzles spray liquid with a reduced reaction time during the upward movement, since the first valve is arranged directly on the adapter. As a result, the reaction times may be equalized during upward and downward wiping.

It may be particularly preferred that the second valve is not permeable to the liquid during a movement in the first direction, wherein the first valve is not permeable to the liquid during a movement in the second direction. As a result, it is possible to prevent the lines being undesirably emptied.

A particular development may include that the first valve is arranged in the direction of flow of the liquid upstream of a securing clip of the wiper arm, wherein the securing clip extends transversely to the longitudinal extent of the wiper arm. The securing clip encompasses the adapter part on the wiper blade side and fixes the wiper blade to the wiper arm. The valve is arranged between the clip and the wiper arm, in particular in a groove.

So that a rapid reaction time may be ensured, it is advantageous to arrange the first and the second valve so as to be removed at different distances from a liquid pump. The liquid pump may be arranged in the vehicle with a reservoir for the liquid. Preferably, by arranging the first valve in the vicinity of the region of the nozzle and by further adapting the spacing of the first valve from the pump, after the actuation of the pump the liquid from the nozzle for the first direction is able to exit after a shorter time than from the nozzle for the second direction.

It goes without saying that the features which are mentioned above and which are still to be described below may be used not only in the respectively specified combination but also in other combinations. The scope of the invention is defined only by the claims.

BRIEF DESCRIPTION OF THE DRAWINGS

The invention is described in more detail hereinafter by means of an exemplary embodiment with reference to the accompanying drawing, in which:

FIG. 1 shows a wiper lever with valves.

DETAILED DESCRIPTION

FIG. 1 shows a wiper lever 10 for cleaning a vehicle pane by means of a reciprocating movement, wherein the movement takes place in a first and a second direction 1, 2. The first direction 1 represents an upward wiping along the pane, whilst the movement in the second direction represents a downward wiping.

The wiper lever 10 comprises a wiper blade 12, a wiper arm 14, an adapter 16 for securing the wiper blade 12 to the wiper arm 14. The adapter 16 comprises an adapter part on the blade side and an adapter part on the arm side. The adapter part on the arm side has a securing clip 22 which encompasses the adapter part on the blade side when the wiper blade 12 is secured to the wiper arm 14. The invention, however, may also be applied to an adapter which does not have a securing clip 22. A two-part adapter part on the blade side may be provided, wherein a part of the adapter part on the blade side is movable.

A hydraulic system 18 is part of the wiper lever, wherein the hydraulic system 18 has liquid lines 19, a reservoir for the liquid and a pump 24. The pump 24 conveys a liquid from a vehicle through the lines via the wiper arm 14 to the wiper blade 12 in order to eject it through nozzles 20 on the wiper blade 12.

At least two nozzles 20 are provided, wherein at least one nozzle 20 is oriented in the first direction 1 and one nozzle 20 is oriented in the second direction. The nozzles may be formed in a rubber element, for example a wiper rubber or spoiler, of the wiper blade 12 and/or in a separate nozzle unit which is secured to the wiper blade 12. A heating element may also be provided, a freezing of the liquid being avoided thereby, wherein the heating element is arranged in the region of the nozzles and/or the lines.

A first valve 221 which controls the exit of liquid in the first direction is positioned in the direction of flow 3 of the liquid closer to the nozzles 20 than a second valve 222 which controls the ejection of the liquid in the second direction 2. The direction of flow of the liquid is oriented toward the nozzles 20, starting from the reservoir and the pump 24.

During the cleaning movement which is performed as a reciprocating movement, the first direction 1 represents an upward wiping. The second direction 2 is performed as a downward wiping. The first valve 221 permits liquid to pass to the nozzles 20 which are oriented in the first direction 1. This takes place during upward wiping, whilst during downward wiping the second valve 222 permits liquid to pass to the nozzles which are oriented in the second direction 2. The liquid is sprayed directly upstream of a wiper rubber of the wiper blade 12, so that after the application thereof the liquid may be wiped away immediately by the wiper blade. The two valves 221, 222 alternate during the wiping movements such that the first valve 221 is opened and the second valve 222 is closed during upward wiping, whilst the second valve is opened and the first valve 221 is closed during downward wiping.

Since generally the wiping process starts with an upward movement, the time until the ejection of liquid may be reduced by the position of the first valve 221 which is spatially close to the nozzles 20. Moreover, the time until the liquid is ejected may also be set by the length of the lines 19 from the pump 24 or the reservoir to the valves 221, 222.

The closer the valve 221, 222 is to the pump 24 or the reservoir, the more quickly the liquid is able to reach the nozzle 20.

The first valve 221 is arranged in the direction of flow of the liquid upstream of the securing clip 22 of the wiper arm 14, wherein the securing clip 22 extends transversely to the longitudinal extent of the wiper arm 14. The first valve 221 is arranged in a groove between the securing clip 22 and the wiper arm 14, wherein the valve 221 is arranged on the side of the securing clip 22 which faces toward the vehicle.

LIST OF REFERENCE NUMERALS

1 First direction
2 Second direction
3 Direction of flow
10 Wiper lever
12 Wiper blade
14 Wiper arm
16 Adapter
18 Hydraulic system
19 Lines
20 Nozzle
22 Securing clip
24 Liquid pump
221 First valve
222 Second valve

What is claimed is:

1. A wiper lever (10) for cleaning a vehicle pane by means of a movement in a first direction (1) and a second direction (2), comprising a wiper blade (12), a wiper arm (14), an adapter (16) for securing the wiper blade (12) to the wiper arm (14) and a hydraulic system (18) which conducts a liquid from a vehicle to the wiper blade (12) via the wiper arm (14) in order to eject the liquid via nozzles (20) on the wiper blade (12), wherein the hydraulic system (18) includes a pump (24), a first liquid line (19) extending from the pump (24), and a second, separate liquid line (19) extending from the pump (24), wherein a first nozzle (20) is oriented in the first direction (1) and a second nozzle (20) is oriented in the second direction (2), wherein a first valve (221) for the first direction is positioned in the first liquid line (19) and a second valve (222) for the second direction is positioned in the separate second liquid line (19), wherein a first flow (3) of liquid is configured to flow through the first liquid line (19) along a first flow path to the first nozzle (20), and a second flow (3) of liquid is configured to flow through the second liquid line along a second flow path to the second nozzle (20), wherein the first valve (221) is positioned closer to the first nozzle (20) in the first flow path than the second valve (222) is positioned to the second nozzle (20) in the second flow path.

2. The wiper lever (10) as claimed in claim 1, wherein the movement for the cleaning is a reciprocating movement, wherein the first direction is an upward wiping and the second direction (2) is a downward wiping, wherein the first valve (221) permits liquid to pass to the first nozzle (20), whilst the second valve (222) permits liquid to pass to the second nozzle (20).

3. The wiper lever (10) as claimed in claim 1, wherein the second valve (222) is not permeable to the liquid during a movement in the first direction (1), wherein the first valve (221) is not permeable to the liquid during a movement in the second direction (2).

4. The wiper lever (10) as claimed in claim 1, wherein the first valve (221) is arranged upstream of a securing clip (22) of the wiper arm (14), wherein the securing clip (22) extends transversely to the longitudinal extent of the wiper arm (14).

5. The wiper lever (10) as claimed in claim 1, wherein the first and the second valve (221, 222) are removed at different distances from the pump (24).

6. The wiper lever (10) as claimed in claim 1, wherein the second valve (222) is positioned closer to the pump (24) than to the second nozzle (20) along the second liquid line (19).

7. The wiper lever (10) as claimed in claim 1, further comprising at least one additional valve positioned within the first fluid line or the second fluid line.

8. The wiper lever (10) as claimed in claim 1, wherein after the actuation of the pump (24), the liquid from the first nozzle (20) for the first direction (1) is configured to exit after a shorter time than from the second nozzle (20) for the second direction (2).

* * * * *